Figure 1:
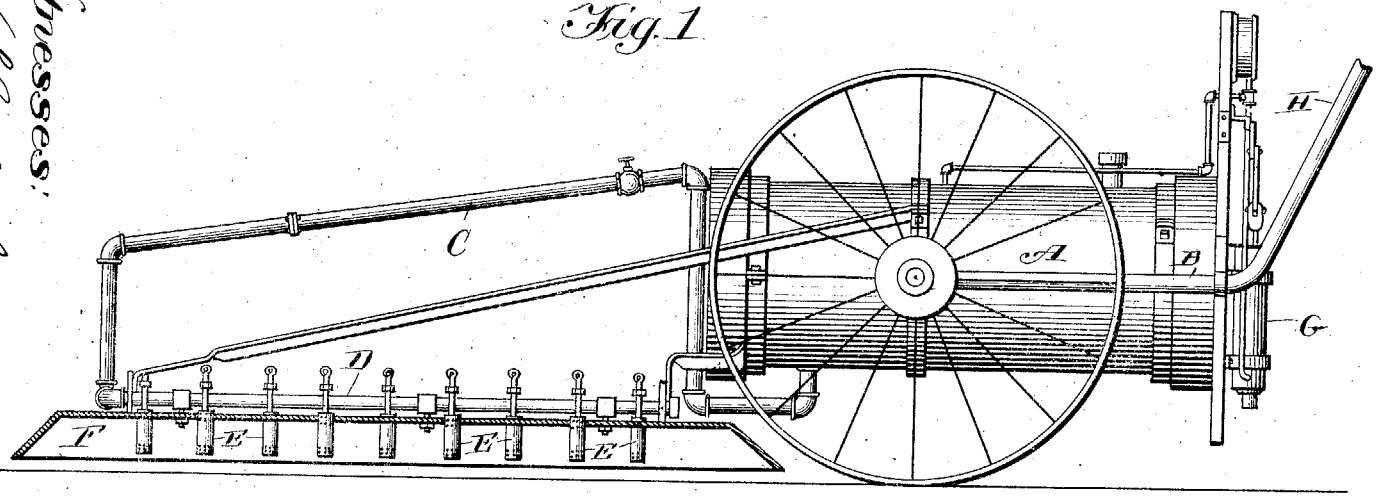

No. 12,077. REISSUED FEB. 3, 1903

A. H. PERKINS, DEC'D.

THE UNITED STATES REPAIR & GUARANTY COMPANY, ASSIGNEE.

METHOD OF REPAIRING AMERICAN ASPHALT PAVEMENTS.

APPLICATION FILED SEPT. 11, 1902.

Witnesses:
H. S. Gaither
M. D. Perry

Amos H. Perkins
Inventor:
The United States Repair & Guaranty Co.
Assignee
by Chamberlin and Wilkinson
its Attorneys.

UNITED STATES PATENT OFFICE.

THE UNITED STATES REPAIR & GUARANTY COMPANY, OF CHICAGO, ILLINOIS, A CORPORATION OF ILLINOIS, ASSIGNEE, BY MESNE ASSIGNMENTS, OF AMOS H. PERKINS, DECEASED.

METHOD OF REPAIRING AMERICAN ASPHALT PAVEMENTS.

SPECIFICATION forming part of Reissued Letters Patent No. 12,077, dated February 3, 1903.

Original No. 501,537, dated July 18, 1893. Application for reissue filed September 11, 1902. Serial No. 123,034.

*To all whom it may concern:*

Be it known that THE UNITED STATES REPAIR & GUARANTY COMPANY, a corporation duly organized under the laws of the State of Illinois, hereby makes application for the reissue of Letters Patent No. 501,537, granted to AMOS H. PERKINS on July 18, 1893, covering a certain new and useful Improvement in the Method of Repairing American Asphalt Pavements, the said applicant being the assignee of the entire right, title, and interest in and to the invention covered by the said Letters Patent; and the following is declared to be a full, clear, and exact description of the invention, such as will enable others skilled in the art to which it pertains to make and use the same, reference being had to the accompanying drawings, which form a part of this specification.

The invention is designed to produce a method whereby the repairing of American asphalt pavements may be quickly and cheaply accomplished and a neater-appearing pavement be obtained after repairing than has heretofore been the case.

Heretofore in the repairing it has been customary to dig out with a pick or other instrument the surface material around the spot to be repaired, sometimes applying heat to the spot to soften the material, so that it may be more easily removed. When the material has been removed, the depression thus made is thoroughly cleaned and given a coat or dressing of tar. New material in a heated state has then been placed in the depression and been ironed down and smoothed off in the usual manner of finishing, the tar acting as a solder to hold the new material in place. When completed, however, the line or joint between the old hardened material and the new material has been plainly discernible, and more often there has been more or less of a ridge. Again, this new block of material by reason of frost or from other causes is frequently torn loose from its soldered connection with the old material, thus necessitating new repairs. In practicing the invention the spot to be repaired and the surrounding edges are subjected to such a degree of heat that the surface asphalt, not only the exact spot to be repaired, but the surrounding portion to a greater or less degree, is reduced to the soft pliable state in which it is originally laid. With a rake or other suitable instrument it is then agitated and mixed with enough new material to fill up the spot to be repaired. It is then subjected to the usual finishing operation of ironing and burnishing. The heating by a blast of the surface may be accomplished in various ways and by means of various forms of apparatus, but one form for accomplishing the result being herein shown; yet it should be understood that applicant is not limited to any particular form of apparatus for carrying out the invention.

Figure 2:
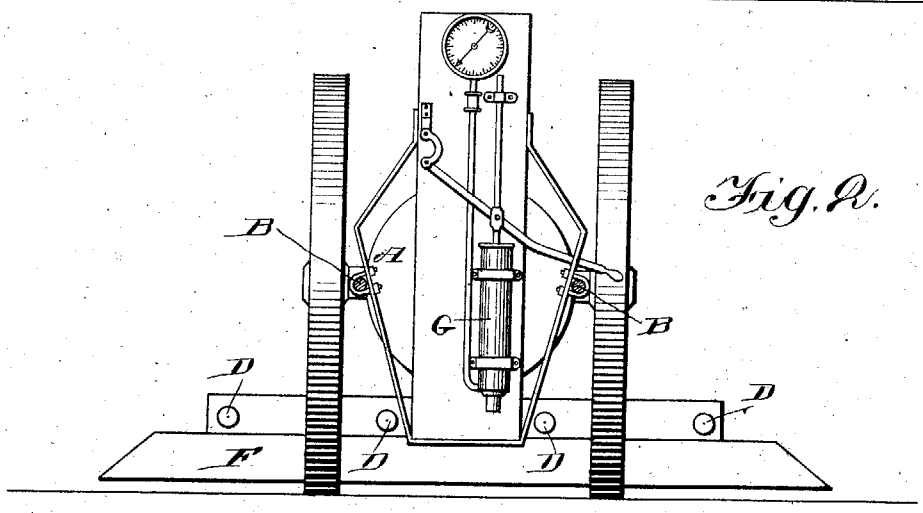

In the drawings, Figure 1 represents a side elevation, and Fig. 2 an end elevation, of an apparatus for heating the pavement after it is laid.

In carrying out the invention, A represents a suitable tank for carrying gasolene, mounted on the wheeled frame B, connected by the pipe C with a series of horizontal pipes D. These pipes D carry a series of burners E, which pass through a hood or shield F and project a flame downward against the pavement. Pressure is then obtained upon the gasolene to force it to the burners and to produce a blast by means of an air-pump G, mounted upon the tank.

The apparatus is also provided with a handle H, whereby the operator may readily move it to any desired spot. Now, as would be seen, by turning on as many of the burners as are desired a strong blast of heat is projected against the surface of the asphalt and readily melts it. As explained above, when it is desired to repair a spot the apparatus is moved adjacent thereto, with the burners directly above the spot. These soon reduce the surface asphalt both at the spot and at the surrounding edges to a pliable state, the strong blast causing not only the immediate surface, but the particles deep down, to be melted and yet not burned. With a rake or other suitable instrument the operator then agitates or stirs up the softened material, and by adding new material of substantially the same degree of softness the spot or depression to be repaired is filled up and subjected to the usual smoothing and finishing operation, as in the case of a new pavement. This, as will be seen, is done without the use of tar for the purpose of uniting the parts or sections of material and is done without any distinct dividing-line between the old and new material. In fact, there is no dividing-line, because the new material has been mixed with and becomes a part of the old material. As stated above, while heating the spot to be repaired the surrounding edges or portions must be heated to a greater or less degree, and the new material is worked into these edges, as well as in the spot to be repaired, so that when hardened it is practically impossible to tell where the pavement has been repaired.

What is claimed is—

1. The method of repairing American asphalt pavement which consists in subjecting the spot to be repaired to a blast of heat, adding new material, and smoothing and burnishing it substantially as described.

2. The method of repairing asphalt pavement which consists in subjecting the spot to be repaired to a strong blast of heat, adding new material, and smoothing and burnishing it substantially as described.

3. The method of repairing asphalt pavement, which consists in subjecting the spot to be repaired and the surrounding edges to such a blast of heat as will cause the asphalt, at not only the spot to be repaired but the surrounding portion, to a greater or less degree, to be reduced to the soft pliable state in which it was originally laid, adding new material, and finally smoothing and burnishing it.

4. The method of repairing asphalt pavement, which consists in subjecting the spot to be repaired and the surrounding edges to such a blast of heat as will cause the asphalt, at not only the spot to be repaired but the surrounding portion, to a greater or less degree, to be reduced to the soft pliable state in which it was originally laid, agitating the soft material and mixing it with new material, and finally smoothing and burnishing it.

THE UNITED STATES REPAIR & GUARANTY CO.,
By VOLNEY W. FOSTER,
*Prest.*

Witnesses:
LILLIAN TILTON.
M. C. SMITH.